(No Model.) 2 Sheets—Sheet 1.
A. BUSH.
PLANTER AND FERTILIZER DISTRIBUTER.
No. 482,783. Patented Sept. 20, 1892.
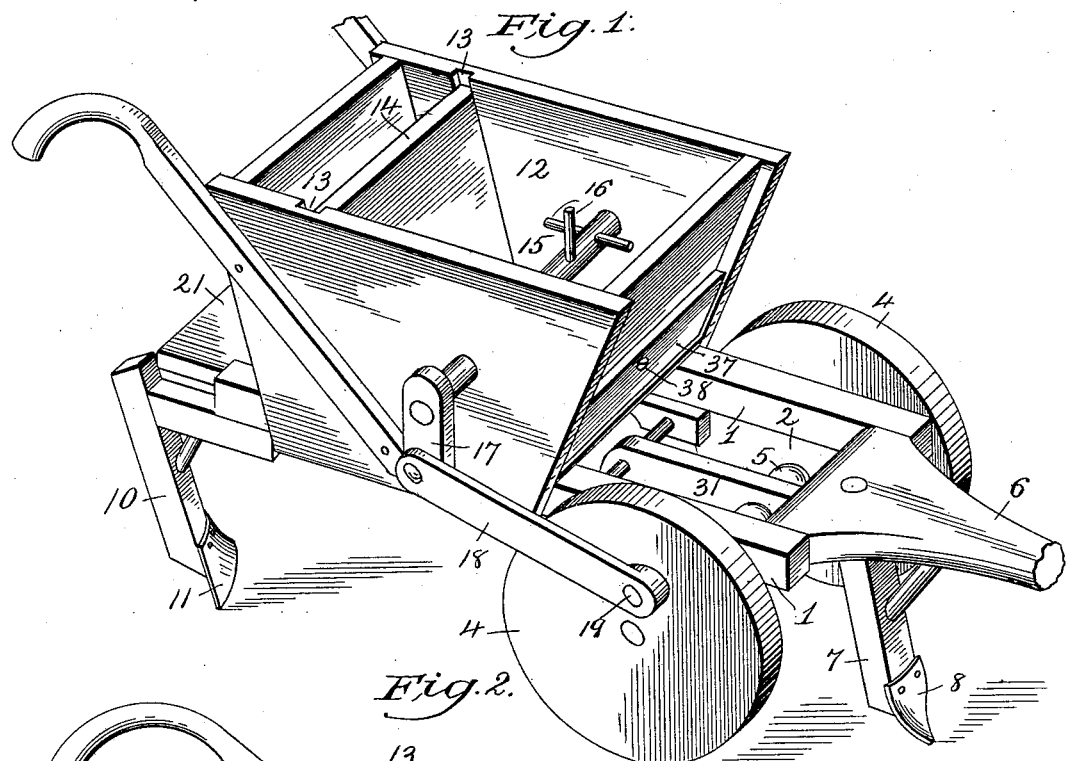
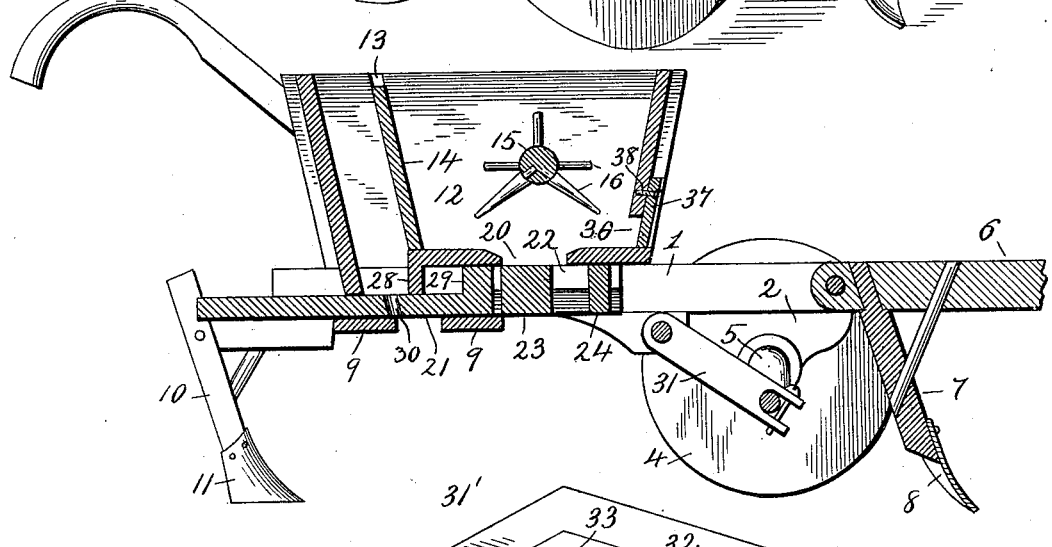
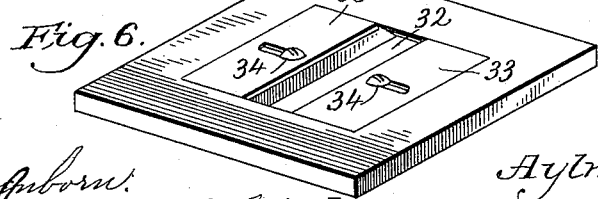
Witnesses
Wm. A. Schoonborn
Jno. K. Liggers
Inventor
Aylmer Bush
By his Attorneys,
C. A. Snow & Co.

(No Model.) 2 Sheets—Sheet 2.

A. BUSH.
PLANTER AND FERTILIZER DISTRIBUTER.

No. 482,783. Patented Sept. 20, 1892.

Witnesses
Wm A Schornborn
Jno H Siggers

Inventor
Aylmer Bush

By his Attorneys,
C A Snow & Co.

UNITED STATES PATENT OFFICE.

AYLMER BUSH, OF SUMMERFIELD, LOUISIANA, ASSIGNOR OF ONE-HALF TO SIDNEY S. TATUM, OF SAME PLACE.

PLANTER AND FERTILIZER-DISTRIBUTER.

SPECIFICATION forming part of Letters Patent No. 482,783, dated September 20, 1892.

Application filed June 6, 1892. Serial No. 435,689. (No model.)

*To all whom it may concern:*

Be it known that I, AYLMER BUSH, a citizen of the United States, residing at Summerfield, in the parish of Claiborne and State of Louisiana, have invented a new and useful Planter and Fertilizer-Distributer, of which the following is a specification.

This invention relates to improvements in planters, the objects in view being to provide a cheap and simple construction of planter adapted to plant corn in drills and simultaneously with the same to open a furrow for the reception of the corn, reclose the same, and with the corn to drill a suitable fertilizer.

Other objects and advantages of the invention will appear in the following description, and the novel features thereof will be particularly pointed out in the claims.

Figure 3:
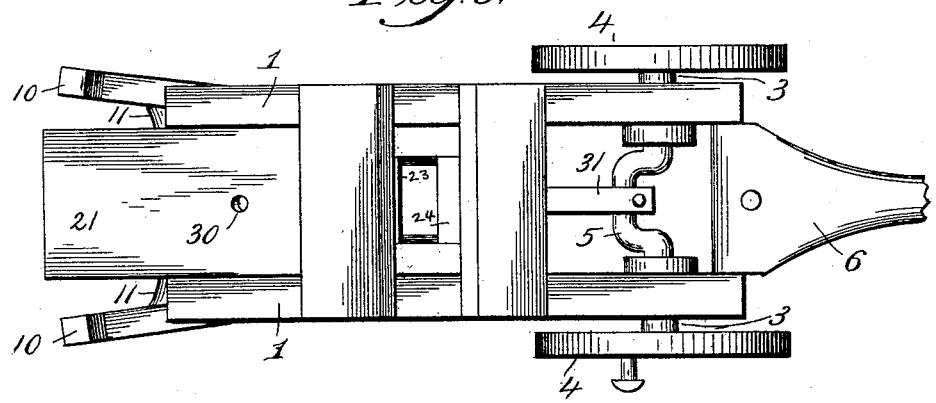
Figure 4:
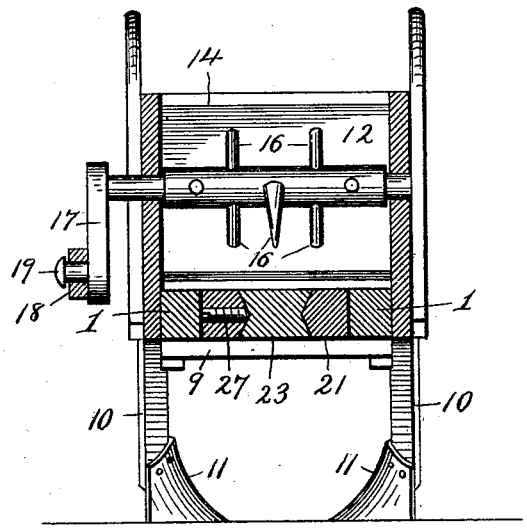
Figure 5:
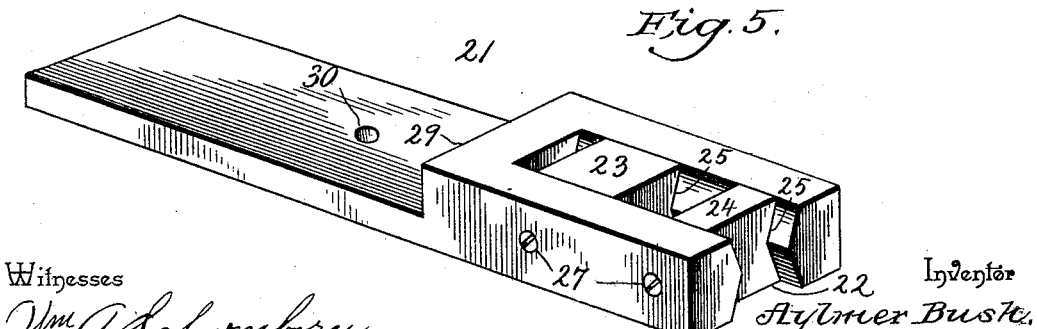

Referring to the drawings, Figure 1 is a perspective view of a planter embodying my invention. Fig. 2 is a vertical longitudinal sectional view. Fig. 3 is a detailed plan view, the hopper removed. Fig. 4 is a transverse section. Fig. 5 is a detail in perspective of the seed-slide. Fig. 6 is a detail in perspective of the false bottom employed in the discharge of fertilizer alone.

Like numerals indicate like parts in all the figures of the drawings.

1 designates the opposite side bars or beams of the machine, which are provided at their front ends and under sides with bearing-boxes 2, in which is journaled a transverse axle 3. The ends of the axle beyond the boxes carry ground-wheels 4 and between the boxes is bent to form a crank 5.

Pivoted between the front ends of the bars 1 in advance of the axle is a tongue 6, and the same has secured to and depending from its under side a standard 7, which carries a furrow-opening shovel 8. At proper points the side bars are connected by transverse frame-bars 9, and from the rear ends of said side bars depend standards 10, which standards carry furrow-closing shovels 11, which straddle the furrow formed by the front shovel 8.

12 designates the hopper, and the same has its opposite sides provided with internal grooves 13, in which is mounted a removable partition 14, dividing the hopper into front and rear compartments. Journaled in the opposite side walls of the hopper is a rotary agitator-shaft 15, and the same is provided with a series of radiating agitator arms or spokes 16. One end of the shaft projects beyond the wall of the hopper and is there provided with a crank 17, the pin of which is connected by a pitman 18 with a crank-pin 19, with which one of the ground-wheels 4 is provided. The distance between the center of the wheel and the pin 19 is something less than the length of the crank-arm 17, so that a revolution of the wheel 4 imparts merely a partial revolution or a rocking motion to the arm and its shaft. The hopper is bottomless below its rear compartment, while the bottom of the front compartment is provided with an opening 20.

Mounted in ways below the opening 20 is a seed-slide 21, and the same is provided at its front end with a recess 22, the opposite edges of which are convexed and adapted to receive a pair of blocks 23 and 24, whose opposite ends are grooved to fit the convexed edges of the recess, as indicated at 25. By a relative movement of the blocks it will be seen that the opening between the same, which constitutes the discharge-opening of the slide, may be increased or diminished, so as to receive and discharge more or less fertilizer. The blocks may be adjusted in their various relative positions and secured at any point desired by means of a pair of set-screws 27, which are passed through the sides of the recess 22 and bear against the blocks.

From the bottom of the hopper there depends a flange 28, against which abuts a transverse shoulder 29, with which the upper side of the slide is provided, and which is formed by a reduction in the width of the slide at a point in front of its center and extends to the rear end thereof. This reduced portion of the slide comes opposite the bottomless rear compartment of the hopper and is provided with a perforation or corn-receiving opening 30. A forked bail 31 has its terminals pivoted in the front end of the seed-slide and at its front portion is loosely connected with the centrally-cranked portion of the axle.

In planting corn and distributing fertilizer the corn is located in the rear compartment and the fertilizer located in the front compartment. The machine moving over the ground causes the wheels to rotate and revolve, and through the medium of the pitman-rod a rocking motion is imparted to the rock-shaft 15, so that the fertilizer cannot become clogged in the hopper, but is loose and readily fed from the same. The rotations of the axle causes the seed-slide to reciprocate, and its opening formed by the blocks 23 and 24 is at intervals brought opposite the opening 20 in the bottom of the front compartment in the hopper, so that the fertilizer is dropped through said opening at intervals and at every revolution of the wheels. By the same movement the opening 30 catches two or more seeds and brings them opposite and drops them through a space formed by the cross-bars 9, before mentioned. It will be noticed that the front shovel will open the furrow and that the fertilizer and corn will be simultaneously dropped into the furrow thus formed and that the following shovels 11 will serve to close the furrow, so that the planting is complete.

If desired, the machine may be employed solely for fertilizing purposes, in which instance a false bottom 31' is inserted into the hopper, the partition having been removed for the purpose of permitting the insertion of the bottom. The bottom is provided with a rectangular opening 32 and at opposite sides of the same with shallow recesses, which receive the opposite gage-plates 33. These gage-plates are slotted, and set-screws 34 pass through the opening and into the bottom. By this means the discharge-slot formed between the edges of the gage-plates may be increased or decreased in size, and consequently the amount of fertilizer put out may be regulated.

In inserting the false bottom the same is passed through a transverse opening 36, formed in the front wall of the hopper near the lower edge thereof, and in order to retain the bottom in position a cleat 37 is secured by a screw 38 to the said front wall. When the false bottom is not in use and the machine is employed for both distributing fertilizer and planting corn, the cleat is employed to close the opening, as shown in Fig. 1 of the drawings.

From the foregoing description, in connection with the accompanying drawings, it will be seen that I have provided a combined fertilizer-distributer and corn-planter embodying simplicity and ease of operation, which planter will open a furrow, drop corn, distribute fertilizer, and reclose the furrow over the corn and fertilizer, all in one continuous operation.

Having described my invention, what I claim is—

1. In a planter, the combination, with the framework, the cranked axle, and ground-wheels, of the hopper mounted on the framework and having its opposite side walls provided with grooves, a removable partition mounted in the grooves, an opening in front of the hopper, a closure for the same, a bottom for the front compartment of the hopper, provided with an opening and at its rear edge with a depending stop, constituting a cut-off, a seed-slide recessed at its front end and in rear of the same reduced, said slide being mounted in the framework under the hopper and by its reduction forming a stop or shoulder, a pair of adjustable blocks mounted in the recess and adapted to form an intervening opening and perforations in the rear reduced portion of the slide, and connections between the slide and crank of the axle, substantially as specified.

2. In a planter, the combination of the opposite side bars terminating at their rear ends in shovel-carrying standards and the front pivoted tongue carrying a furrow-opening shovel, the centrally-cranked axle having the opposite ground-wheels and the transverse bars connecting the side bars of the hopper, the opposite side walls of which are internally recessed, a partition removably mounted in the recess and forming a front and a rear compartment, a bottom located in the front compartment and provided with an opening and at its rear edge opposite the partition with a depending portion, forming a combined cut-off and stop, the seed-slide recessed at its front end and having the opposite edges of its recess convexed, a pair of blocks mounted in the recess and having their opposite edges concaved to conform to the edges of the recess, set-screws passed through the sides of the seed-slide and bearing on the blocks, said slide in rear of the recess being reduced upon its upper side to form a transverse shoulder adapted to abut against a stop and provided in rear of its shoulder with a seed-opening, and a forked bail loosely connected to the front end of the slide and at its front end to the central crank of the axle, substantially as specified.

In testimony that I claim the foregoing as my own I have hereto affixed my signature in the presence of two witnesses.

AYLMER BUSH.

Witnesses:
W. S. KIMBELL,
H. A. BARROW.